(12) United States Patent
Miyakawa et al.

(10) Patent No.: US 6,659,261 B2
(45) Date of Patent: Dec. 9, 2003

(54) CERAMIC SHAPED BODY-POSITIONING SYSTEM

(75) Inventors: Takashi Miyakawa, Nagoya (JP); Kenji Koide, Nagoya (JP); Akira Maruyama, Nagoya (JP)

(73) Assignee: NGK Insulators, Ltd. (JP)

( * ) Notice: Subject to any disclaimer, the term of this patent is extended or adjusted under 35 U.S.C. 154(b) by 7 days.

(21) Appl. No.: 09/919,593

(22) Filed: Aug. 1, 2001

(65) Prior Publication Data

US 2002/0043444 A1 Apr. 18, 2002

(30) Foreign Application Priority Data

Aug. 15, 2000 (JP) ........................................ 2000-246185

(51) Int. Cl.$^7$ .............................................. B65G 47/00
(52) U.S. Cl. ................................................ 198/345.1
(58) Field of Search ............................ 198/345.1, 379, 198/456; 414/222.04

(56) References Cited

U.S. PATENT DOCUMENTS

| | | | |
|---|---|---|---|
| 2,614,681 A | * 10/1952 | Keil | 198/379 |
| 4,257,151 A | * 3/1981 | Coots et al. | 198/379 |
| 4,502,585 A | 3/1985 | Sticht | |
| 4,741,429 A | 5/1988 | Hattori et al. | |

FOREIGN PATENT DOCUMENTS

| | | |
|---|---|---|
| JP | 61226415 | 10/1986 |
| WO | WO 98/25841 | 6/1998 |

* cited by examiner

*Primary Examiner*—Joseph E. Valenza
(74) *Attorney, Agent, or Firm*—Parkhurst & Wendel, L.L.P.

(57) ABSTRACT

A ceramic shaped body-positioning system which can accurately position even a thin-walled ceramic honeycomb shaped body without occurring deformations, cracks and breakages of the ceramic shaped bodies and which is particularly suitable for positioning odd-shaped products is provided. A positioning system 1 for a ceramic shaped body 2 is used for positioning the ceramic shaped body 2 to accurately convey the ceramic shaped body 2 to the next step. The positioning system 1 comprises a centering table 3 for placing the ceramic shaped body 2, a plurality of chucking unit 4-1 each consisting of a chucking body 5-1 and a pair of ceramic shaped body-pushing members 5-1*a* and 5-1*b* provided in the chucking body, and a drive unit 6 for moving the chucking unit 4-1 toward/away from the ceramic shaped body 2 on the centering table 3. The plurality of chucking units 4-1 and 4-2 are simultaneously moved toward the ceramic shaped body 2 on the centering table 3 while controlling positions and speeds of the chucking units 4-1 and 4-2, thereby adjusting the position of the ceramic shaped body 2 on the centering table without giving a shock on the ceramic shaped body.

13 Claims, 5 Drawing Sheets

CERAMIC SHAPED BODY-POSITIONING SYSTEM

BACKGROUND OF THE INVENTION

1. Field of the Invention

The present invention relates to a ceramic shaped body-positioning system, which is used for accurately conveying the ceramic shaped bodies to the following step by adjusting positions of the ceramic shaped bodies.

2. Description of the Related Art

Heretofore, the following process is known as an example of a process for producing ceramic products such as ceramic honeycomb structural bodies. First, ceramic shaped bodies are obtained by molding a ceramic material and cut in a given length. Then, the cut ceramic shaped bodies are individually placed on cradles, and the cradles on which the ceramic shaped bodies are placed are moved on and along a conveyor path. After the movement, the ceramic shaped bodies are then dried in such a state that a given number of (for example, five) ceramic shaped bodies are aligned, and both end face positions of the dried ceramic shaped bodies are cut for finish working. Finally, the finish worked ceramic shaped bodies are fired to obtain ceramic products.

In the aforementioned conventional process for producing the ceramic honeycomb structural bodies, when, for example, the ceramic shaped body is conveyed to a finishing step after drying, it is necessary to position the ceramic shaped body by correcting lateral and directional deviations of the ceramic shaped body on a table on which the ceramic shaped body is placed in order to accurately convey the ceramic shaped body to the subsequent finishing step. NGK Insulator, Ltd. discloses a technique for the above positioning in JP-A-61-226415, in which a plurality of actuators driven by air cylinders center the shaped bodies to a predetermined position on a conveyor belt in a simple and precise manner.

In the aforementioned conventional positioning system for the ceramic shaped bodies, when a green ceramic honeycomb shaped body is to be positioned, a shock is applied to the ceramic honeycomb shaped body through contacting the actuator upon a peripheral face of the ceramic honeycomb shaped body. Even if such a shock acts upon the ceramic honeycomb shaped bodies, the conventional ceramic honeycomb shaped bodies are not deformed, cracked or broken since such ceramic honeycomb shaped bodies have a cell-wall thickness of about 150 $\mu$m and a cell density of about 400 cell/sq. in. and thus have high strengths. Therefore, final ceramic products can be obtained without any problems.

However, thin-walled ceramic honeycomb shaped bodies having a cell-wall thickness of 120 $\mu$m or less and a cell density of about 400–1600 cell/sq. in., which are highly demanded these days, are much weaker than the conventional shaped bodies especially in the green state. Thus, when the thin-walled ceramic honeycomb shaped bodies are positioned with a conventional positioning system for the ceramic shaped bodies, the ceramic shaped body may be deformed, cracked or, in an extreme case, even broken with the shock caused by the actuators since it is difficult to reduce the speeds of the actuators at the time of gripping the ceramic honeycomb shaped body. On the contrary, if such a ceramic honeycomb shaped body is chucked with a weak force so as not to break it, another problem of a poor positioning accuracy occurs. The problem is more significant especially when the ceramic honeycomb shaped body having an odd-shaped (asymmetric) cross section is to be positioned.

It is a conventional practice for overcoming the above problems that lengths of arms and gripping rollers are adjusted or replaced according to the kinds of products to modify a chucking unit. Especially for odd-shaped products, specially designed arms and rollers are required. However, such an adjustment or a replacement is time-consuming and causes a low productivity.

SUMMARY OF THE INVENTION

It is, therefore, an object of the present invention to solve the above problems and to provide a ceramic shaped body-positioning system which can accurately position even thin-walled ceramic shaped bodies without causing deformations, cracks or breakages.

The ceramic shaped body-positioning system according to the present invention is used for positioning the ceramic shaped body to accurately convey the ceramic shaped body to a next step, which comprises a centering table for placing the ceramic shaped body, a plurality of chucking units comprising a chucking body and a ceramic shaped body-pushing member provided in the chucking body, and a drive unit for moving the chucking units toward/away from the ceramic shaped body on the centering table, wherein the drive unit makes the plurality of chucking units simultaneously approach and push the ceramic shaped body on the centering table while controlling positions and speeds of the chucking units, thereby adjusting the positions of the ceramic shaped body on the centering table with giving substantially no destructive shock on the ceramic shaped body.

In the aforementioned positioning system according to the present invention, the plurality of chucking unit simultaneously approach and push the ceramic shaped body to adjust the position of the ceramic shaped body on the centering table while controlling the positions and the speeds of the chucking units, therefore even if the positioning system is applied for the ceramic shaped bodies having low strength such as thin-walled ceramic honeycomb structural bodies, the ceramic shaped body can be accurately positioned without causing deformations, cracks and breakages.

In a preferred embodiment of the present invention, it is preferable that the drive unit for moving the chucking unit comprises at least one servomotor, since the system can control the positions and the speeds of the chucking unit more accurately than the conventional system driven by air cylinders does. It is also preferable that the ceramic shaped body-pushing member is configured in a manner that it can be detachably mounted at any of given positions on the chucking body, since the system can be adapted to position ceramic shaped bodies having different shapes. Moreover, in this case, it is preferable that the chucking body is provided with a plurality of holes, a shaft are provided for the ceramic shaped body-pushing member, and the shaft is inserted into any of the hole to selectively set the ceramic shaped body-pushing member in the chucking body, since the ceramic shaped body-pushing member can be easily and detachably mounted at a given position on the chucking body. Furthermore, when the chucking body has a planar form and a plurality of holes are provided in the chucking body in a line, the present invention can be more suitably applied for, for example, the cylindrical ceramic shaped bodies having different diameters. When the chucking body has a L-shaped planar form and a plurality of holes are provided and aligned in the chucking body in a L-shape, the present invention can be applied for the odd-shaped ceramic shaped bodies having asymmetric, for example, pentagonal cross sections. Either of the above is preferable.

BRIEF DESCRIPTION OF THE DRAWINGS

For the better understanding of the present invention, reference is made to the accompanying drawings, in which.

DETAILED DESCRIPTION OF THE INVENTION

Figure 1A:
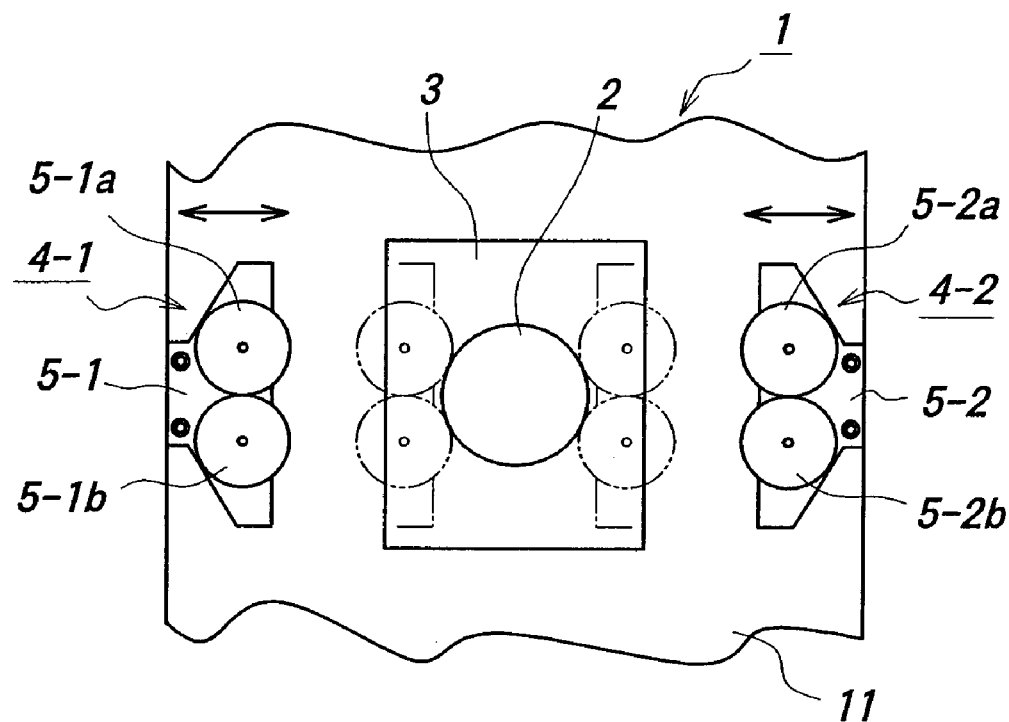
FIG. 1(a) is a top view of a system for positioning the ceramic shaped bodies in accordance with one preferred embodiment of the present invention.
Figure 1B:
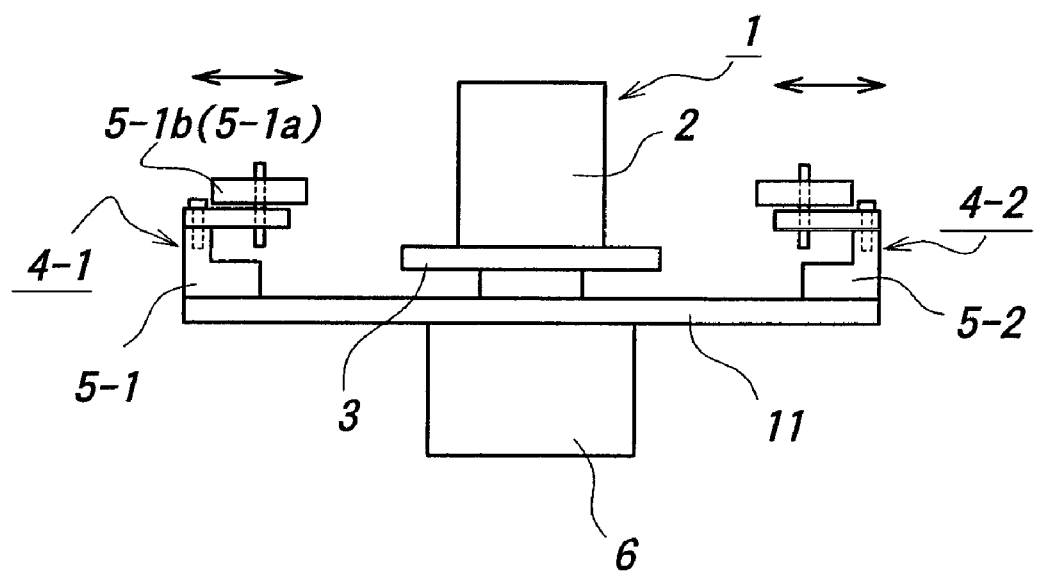
FIG. 1(b) is a front view of the system for positioning the ceramic shaped bodies in accordance with the above embodiment of the present invention.

Referring now to the drawings, FIGS. 1(a) and 1(b) illustrate a top view and a front view, respectively, of a ceramic shaped body-positioning system in accordance with one preferred embodiment of the present invention. In the embodiment shown in FIGS. 1(a) and 1(b), a positioning system 1 for the ceramic shaped bodies according to the present invention comprise a centering table 3 for placing a ceramic shaped body 2, a plurality of (two, in this case) chucking units 4-1 and 4-2 which are provided on a base 11, and a drive unit 6 for moving the chucking units toward/away from the ceramic shaped body 2. Each of the chucking units 4-1 and 4-2 comprises a chucking body 5-1, 5-2 and two pairs of ceramic shaped body-pushing members 5-1a and 5-1b, 5-2a and 5-2b provided in the chucking bodies 5-1 and 5-2, respectively. A peripheral surface portion of each of the ceramic shaped body-pushing members 5-1a, 5-1b, 5-2a and 5-2b is made of an elastic material such as rubber.

The chucking units 4-1 and 4-2 are moved toward and away from the ceramic shaped body 2 under control by the drive unit 6 provided on the base 11. Although the detailed configuration of the servomotor is omitted here, a conventionally known configuration can be adapted. In this embodiment, the drive unit 6 is configured to move the chucking units 4-1 and 4-2 in the same direction, i.e. in an approaching direction or a departing direction, at the same speed. Of course, each of the chucking units 4-1 and 4-2 may have an individual drive unit to be able to independently control the movement. By using a servomotor as the drive unit 6, the positions and the speeds of each of the chucking units 4-1 and 4-2 can be accurately controlled, and even when the ceramic shaped body 2 such as the thin-walled ceramic honeycomb structural body is to be positioned, the ceramic shaped body 2 can be effectively prevented from causing cracks and breakages. Moreover, the ceramic shaped body 2 can be chucked with a sufficient force under fine control by the servomotor, so the positioning precision can be improved. Although a shock is given on the ceramic shaped body even in this case, the shock is remarkably reduced and far from destructive.

In this embodiment, as detailed later, the pairs of the ceramic shaped body-pushing members 5-1a and 5-1b, 5-2a and 5-2b are detachably mounted at given positions on the chucking bodies 5-1 and 5-2, respectively. In this manner, as the ceramic shaped body-pushing members 5-1a, 5-1b, 5-2a and 5-2b are detachably mounted on the chucking bodies 5-1 and 5-2, the system for positioning the ceramic shaped bodies according to the present invention can be readily adapted to the cylindrical ceramic honeycomb structural bodies having different diameters or the odd-shaped ceramic shaped bodies by changing the mounting positions of the ceramic shaped body-pushing members 5-1a, 5-1b, 5-2a and 5-2b on the chucking bodies 5-1 and 5-2 without replacing the entire chucking units 4-1 and 4-2.

Further, in this embodiment, the ceramic shaped body-pushing members 5-1a, 5-1b, 5-2a and 5-2b are mounted on the chucking bodies 5-1 and 5-2 in such a state that each of them can apply a force to the ceramic shaped body 2 in a different direction from the moving direction of the chucking unit 4-1, 4-2 when it contacts said ceramic shaped body. More specifically, each of the ceramic shaped body-pushing members 5-1a, 5-1b, 5-2a and 5-2b is provided so that a tangent line of a contact point is not perpendicular to the moving direction of the chucking body 5-1, 5-2, whereby the ceramic shaped body-pushing body 5-1a, 5-1b, 5-2a, 5-2b can push the ceramic shaped body 2 not only in the moving direction of the chucking unit 4-1, 4-2, but also in a transversal direction to the moving direction. In addition, by providing a plurality of (in this embodiment, two) of ceramic shaped body-pushing members on each of chucking bodies, the system can simultaneously position the ceramic shaped body 2 in both of a moving direction of the chucking units 4-1 and 4-2 and the transversal direction even though the chucking units 4-1 and 4-2 move in uniaxial direction.

In the positioning system 1 for the ceramic shaped bodies shown in FIGS. 1(a) and 1(b), the ceramic shaped body 2 after finishing the previous step, e.g. a drying step is loaded at a given position on the centering table 3 by not-shown means for conveying. In the embodiment shown in FIGS. 1(a) and 1(b), although the system with two chucking units 4-1 and 4-2 for one ceramic shaped body 2 is described, if there is a demand for continuously working a plurality of, for example, five, ceramic shaped bodies in the following step at one time such as a finish working step, the plurality of ceramic shaped bodies are loaded side by side on a not-shown table 3 having a larger shape than the centering table and the plurality of ceramic shaped bodies 2 can be simultaneously positioned by respectively provided pairs of the chucking units 4-1 and 4-2. It may be that a plurality of centering tables are employed, and ceramic shaped bodies 2 are individually placed thereon.

The position of the ceramic shaped body 2 placed on the centering table 3 is roughly adjusted by a device for conveying the ceramic shaped body 2 from the previous step. However, the ceramic shaped body 2 is not exactly positioned on the centering table 3. Therefore, the positioning according to the present invention is necessary. In this embodiment, the chucking units 4-1 and 4-2 are simultaneously moved toward the ceramic shaped body 2 by operating the drive unit 6 (servomotor). On this occasion, the chucking units 4-1 and 4-2 are moved to pre-memorized positions depending on the mounted positions of the ceramic shaped body-pushing members 5-1a, 5-1b, 5-2a and 5-2b, and then the operation of the drive unit 6 is controlled to move the ceramic shaped body 2 to a place where it is to be positioned. In this way, even if the ceramic shaped body 2 is loaded at a place deviated from the positioning place, the ceramic shaped body 2 may be moved to that positioning place by the ceramic shaped body-pushing members 5-1a, 5-1b, 5-2a and 5-2b. After positioning, the chucking units 4-1 and 4-2 are simultaneously moved away from the ceramic shaped body 2, and then the ceramic shaped body 2 already positioned on the centering table 3 is transferred to the next step by a not-shown conveying device.

Figure 2:
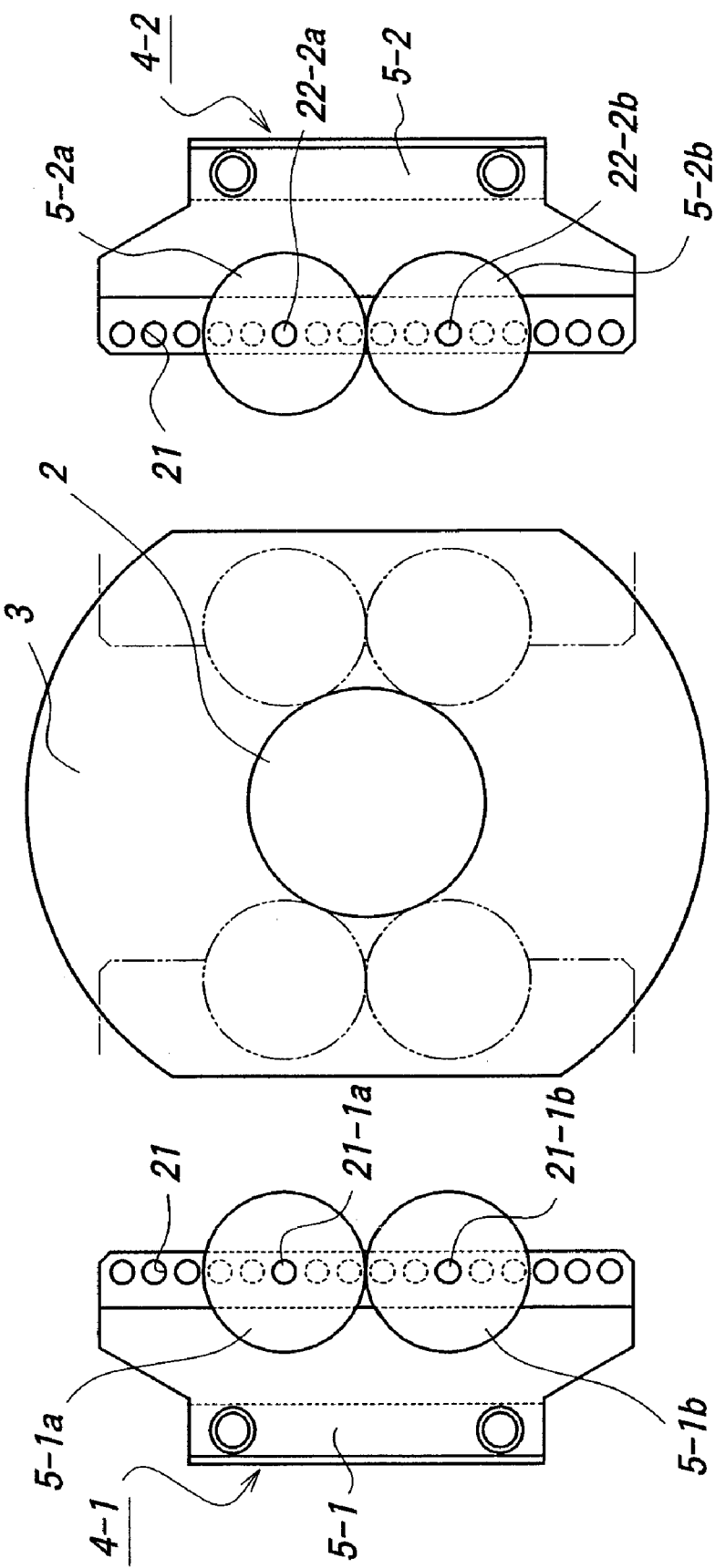
FIG. 2 illustrates the configuration of chucking units in accordance with the above embodiment of the present invention.

In the following, the configuration of other chucking units 4-1 and 4-2 will be described by way of example. FIG. 2 illustrates the configuration of the chucking units 4-1 and 4-2 in accordance with one embodiment of the present invention, in which same or like elements as shown in FIG. 1 are given same numerals and their descriptions will be omitted. In the embodiment shown in FIG. 2, a plurality of holes 21 are provided in the chucking bodies 5-1 and 5-2 and shafts 22-1a, 22-1b, 22-2a and 22-2b are provided in the ceramic shaped body-pushing members 5-1a, 5-1b, 5-2a and 5-2b, respectively. In this embodiment, the chucking bodies 5-1 and 5-2 have planar shapes provided with a plurality of holes 21 in a line. By inserting the shafts 22-1a, 22-1b, 22-2a and 22-2b into appropriate holes, respectively, the pairs of the ceramic shaped body-pushing members 5-1a and 5-1b, 5-2a and 5-2b are mounted on the chucking bodies 5-1 and 5-2, respectively. The chucking units 4-1 and 4-2 shown in FIG. 2 can be used for positioning the ceramic shaped body 2 having an odd shape, and more effectively used for positioning the ceramic shaped body 2 having a symmetrical shape such as a cylindrical shape. By changing mounting positions of the ceramic shaped body-pushing members 5-1a, 5-1b, 5-2a and 5-2b according to the diameter of the ceramic shaped body 2, the same chucking units 4-1 and 4-2 can be adapted for positioning the ceramic shaped bodies 2 having different diameters.

Figure 3:
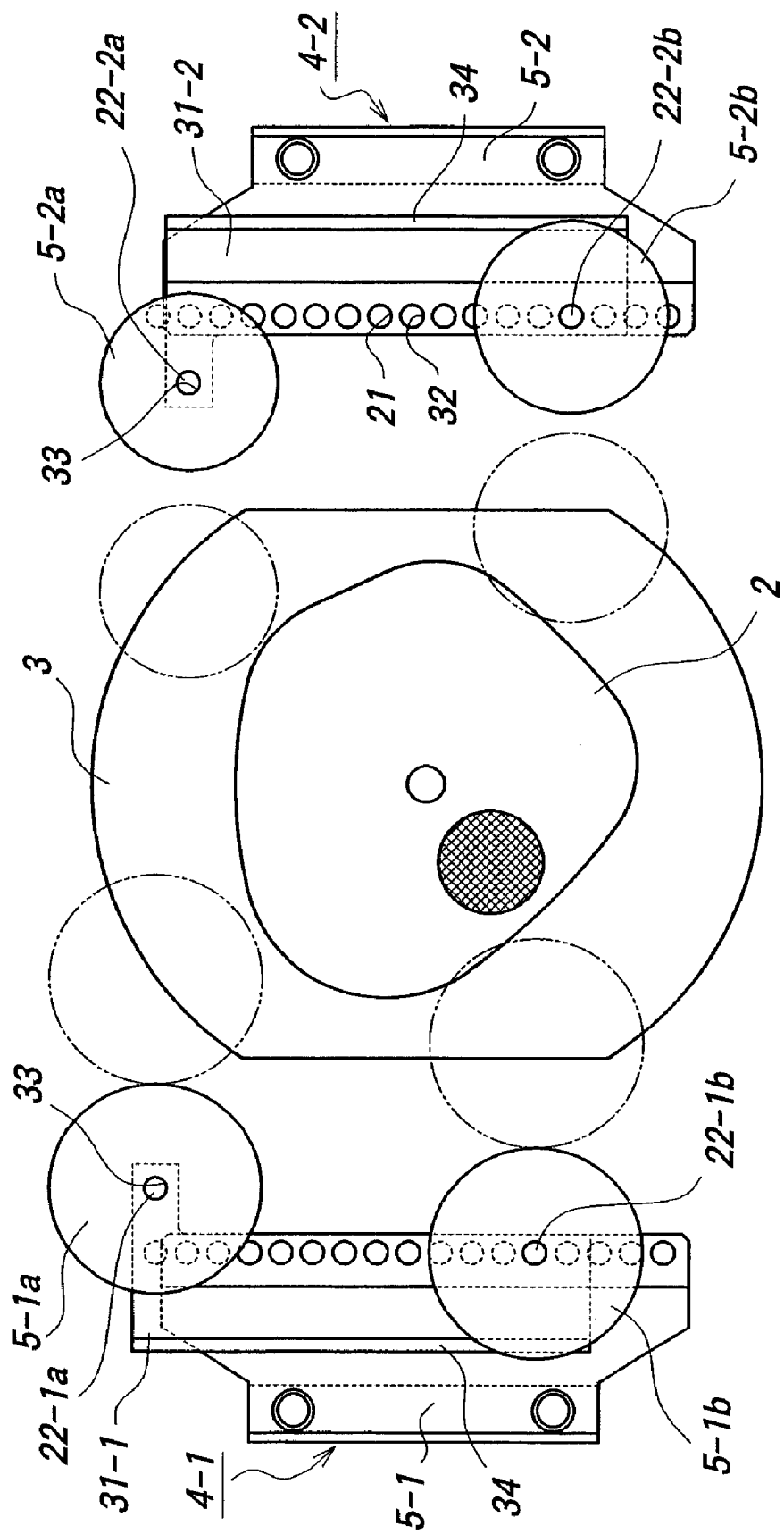
FIG. 3 illustrates the configuration of chucking units in accordance with another embodiment of the present invention.
Figure 4:
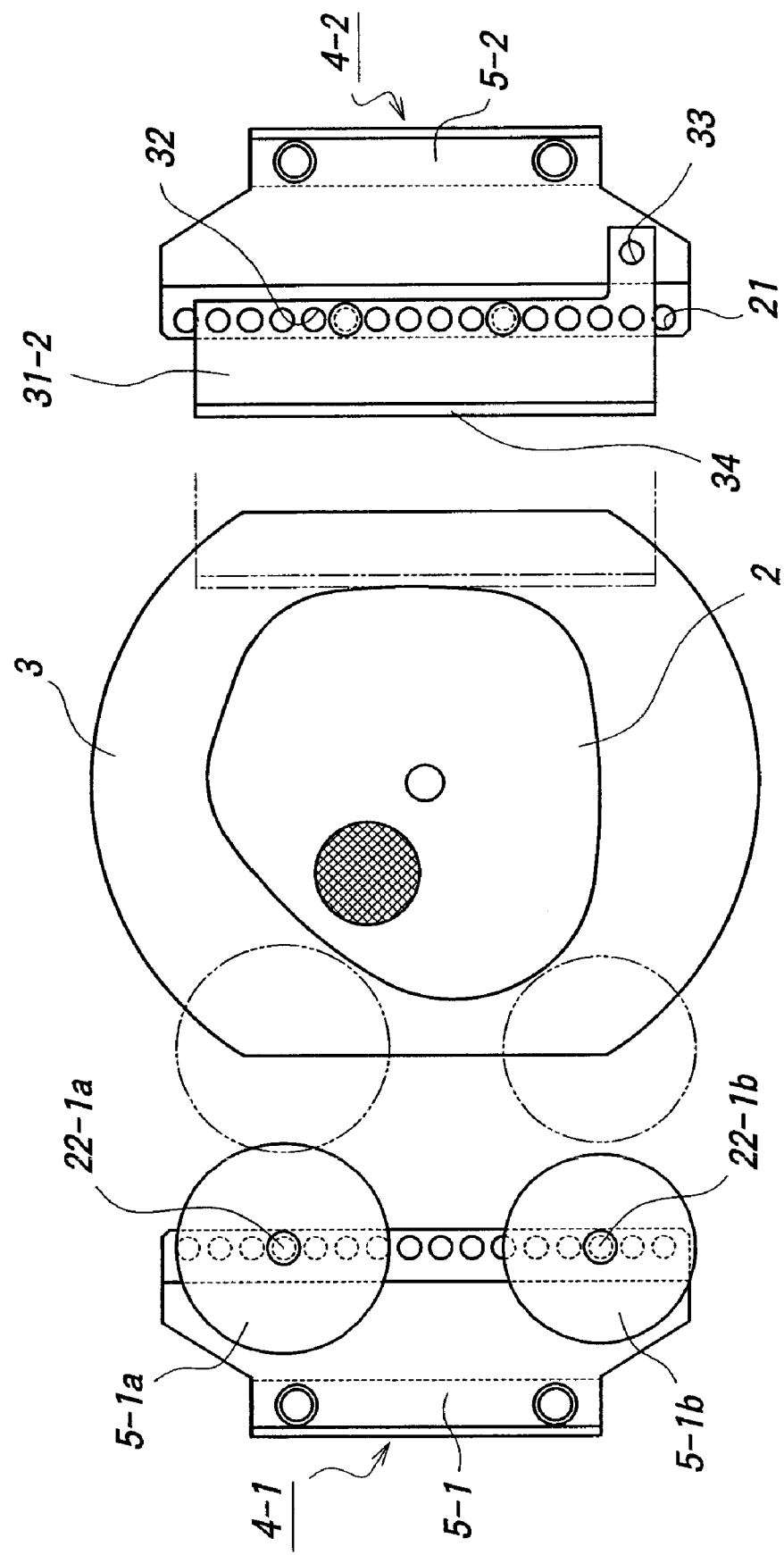
FIG. 4 illustrates the configuration of chucking units in accordance with a further embodiment of the present invention.

FIGS. 3 and 4 illustrate the configurations of chucking units 4-1 and 4-2 in accordance with further embodiment of the present invention. In these figures, same or like elements as shown in FIGS. 1 and 2 are also given same numerals and their description will be omitted.

In the embodiment shown in FIG. 3, L-shaped planar attachments 31-1 and 31-2 provided with a plurality of holes are mounted on the chucking bodies 5-1 and 5-2 shown in FIG. 2, respectively, to make each of the chucking bodies 5-1 and 5-2 into a L-shaped planar form having a plurality of holes in a L-shaped line in the entirety. That is, each of the L-shaped planar attachments 31-1 and 31-2 is provided with a plurality of holes 32 linearly located in the same positions as those of the holes 21 provided in the chucking bodies 5-1 and 5-2 shown in FIG. 2 and a hole 33 located in the vertical portion. By overlapping the holes of the attachments 31-1 and 31-2 with the holes 21 provided in the chucking bodies 5-1 and 5-2 shown in FIG. 2, the holes 21, 32 and 33 are aligned in L-shape in each of the chucking bodies 5-1 and 5-2 in the entirety. In the embodiment shown in FIG. 3, one ceramic shaped body-pushing member 5-1b, 5-2b is inserted in appropriate one of the holes 21, 32 aligned in a line, and the other ceramic shaped body-pushing member 5-1a, 5-2b is inserted in the hole 33 on the vertical portion. This gives an effective positioning for the odd-shaped ceramic shaped body 2.

In the embodiment shown in FIG. 4, one chucking unit 4-1 has the same configuration as that of the chucking unit 4-1 shown in FIG. 2, and the other chucking unit 4-2 is configured by mounting the L-shaped planar attachment 31-2 on the chucking unit 4-2 shown in FIG. 2 in a reverse manner of the embodiment shown in FIG. 3. That is, the L-shaped planar attachment 31-2 is mounted on the chucking body 5-2 so that a linear edge portion without the bent portion of the attachment 31-2 may face the ceramic shaped body 2. Further, a pad 34 is provided on an edge face of the attachment to be contacted with the ceramic shaped body 2. In the embodiment shown in FIG. 4 in which the odd-shaped ceramic shaped body 2 has a flat portion, the ceramic shaped body 2 can be more effectively positioned while the ceramic shaped body 2 contact the flat pad at the flat portion. The attachment 31-2 can be used for both of the embodiments shown in FIGS. 3 and 4. A placing orientation of the odd-shaped ceramic shaped body 2 on the centering table 3 may be variously chosen depending on the conveying means of the previous step, and the chucking units 4-1 and 4-2 having optimum configurations may be selected depending on the chosen orientation of the ceramic shaped body 2.

Figure 5A:
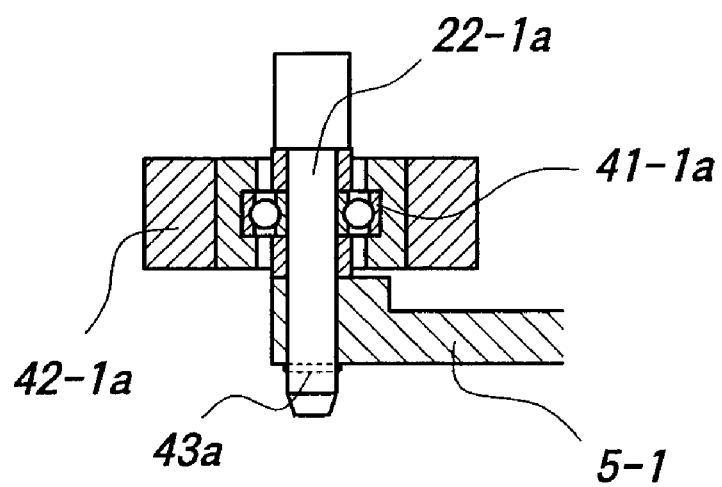
FIG. 5(a) illustrates the configuration in which the ceramic shaped body-pushing members is detachably mounted on the chucking body.
Figure 5B:
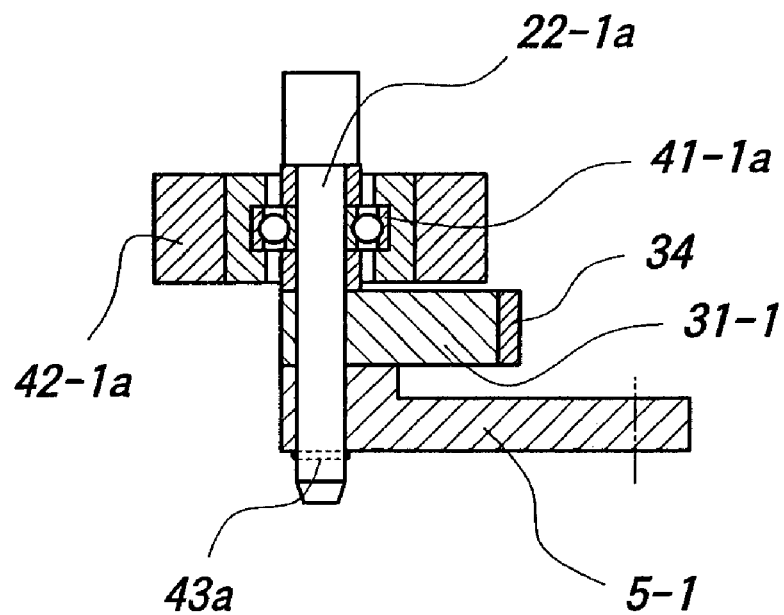
FIG. 5(b) illustrates the configuration in which the ceramic shaped body-pushing member is detachably mounted on the chucking body.

In the following, a configuration where the pairs of the ceramic shaped body-pushing members 5-1a and 5-1b, 5-2a and 5-2b are detachably mounted at given positions on the chucking bodies 5-1 and 5-2, respectively, will be described. Each of FIGS. 5(a) and 5(b) illustrates such a configuration. Hereinafter, the description will be made on the ceramic shaped body-pushing member 5-1a as an example, but it is to be understood that the other ceramic shaped body-pushing members 5-1b, 5-2a and 5-2b have the same configuration. In the embodiment shown in FIG. 5(a), the ceramic shaped body-pushing member 5-1a is mounted on the chucking body 5-1 by directly inserting a shaft 22-1a provided through the ceramic shaped body-pushing member 5-1a into one of the holes 21 provided in the chucking body 5-1. In this embodiment, a pushing element 42-1a of which the peripheral surface is made of elastic body is installed around the shaft 22-1a via a bearing 41-1a to form the ceramic shaped body-pushing member 5-1a. Further, in this embodiment, when the shaft 22-1a is completely inserted through the hole 21, a spring member 43 is provided at a tip of the shaft 22-1a so that the spring member penetrates the shaft 22-1a and a head portion 43a of the spring member 43 stick out from the shaft 22-1a below the chucking body 5-1. The spring member 43 can prevent the ceramic shaped body-pushing member 5-1a from coming off the hole 21. FIG. 5(b) illustrates an embodiment where the attachment 31-1 is installed. The configuration of this embodiment is the same as the embodiment shown in FIG. 5(a) except that the shaft 22-1a also passes through the hole 32 of the attachment 31-1.

In the above embodiments, the chucking units move only in the same linear directions. However, the chucking units may move in different directions. For example, three chucking units may be arranged along a circle while being shaped by 120 degrees or four chucking units arranged along a circle while being shaped by 90 degrees. In these cases, the system can also position the ceramic article in the same manner as mentioned above.

As having clearly shown in the above description, according to the present invention, since a plurality of chucking units are simultaneously moved toward and push the ceramic shaped body on the centering table to adjust the position of the ceramic shaped body on the centering table while speeds of the chucking units upon chucking are controlled with the servomotor to absorb an impact on the ceramic shaped body, even if the positioning system is applied for the ceramic shaped bodies having low strength such as a thin-walled ceramic honeycomb structural body, the ceramic shaped body can be accurately positioned without causing deformations, cracks and breakages. In addition, since the positions of the chucking units can be memorized, the adjustment of the chucking units are easily made according to the kinds of the ceramic shaped bodies, and the positioning precision is improved, so occurrences of improper cuttings can be reduced. Furthermore, with the attachment provided with a plurality of holes, the number of special jigs is reduced and the positioning system can be readily adapted to various kinds of the ceramic shaped bodies including odd-shaped one.

What is claimed is:

1. A body-positioning system for accurately adjusting a position of a ceramic shaped body, said system comprising:

a centering table for placing a ceramic shaped body;

a plurality of chucking units at least one of which comprising at least one body-pushing member mounted on at least one shaft and each chucking body comprising a plurality of holes for receiving said shaft for detachably mounting said body-pushing member on said chucking body, wherein said body-pushing member is for detachable mounting at a first of said plurality of holes in a single horizontal row in the chucking body for contacting a first shaped ceramic body and for detachable mounting in a second hole for contacting a second shaped ceramic body different from said first shaped ceramic body;

at least one path of movement for a ceramic shaped body and at least one said chucking unit on each lateral side of each path; and a drive unit for moving the chucking units toward/away from a ceramic shaped body on the centering table, wherein the drive unit makes the plurality of chucking units approach and push a ceramic shaped body on the centering table while controlling positions and speeds of the chucking units, thereby adjusting the position of the ceramic shaped body on the centering table while conveying substantially no destructive shock to the ceramic shaped body.

2. A ceramic shaped body-positioning system as claimed in claim 1, wherein said drive unit comprise at least one servomotor.

3. A ceramic shaped body-positioning system as claimed in claim 1, wherein said chucking body has a planar form and a plurality of holes are provided in said chucking body in a line.

4. A ceramic shaped body-positioning system as claimed in claim 1, wherein said chucking body has a L-shaped planar form and a plurality of holes are provided and aligned in said chucking body in L-shape.

5. The body-positioning system as claimed in claim 1, wherein said system is configured to simultaneously position a ceramic shaped body in both a moving direction and a direction transverse to said chucking units by mounting said body-pushing member so that the body-pushing member applies a force to a ceramic shaped body in a direction different from the moving direction of the chucking units when the body-pushing member contacts said ceramic shaped body.

6. A ceramic shaped body-positioning system as claimed in claim 3, wherein said system is configured to simultaneously position said ceramic shaped body in both of a moving direction of said chucking units and a transversal direction by mounting said ceramic shaped body-pushing member in such a state that it can apply a force to the ceramic shaped body in a different direction from the moving direction of the chucking units when it contacts said ceramic shaped body.

7. A ceramic shaped body-positioning system as claimed in claim 4, wherein said system is configured to simultaneously position said ceramic shaped body in both of a moving direction of said chucking units and a transversal direction by mounting said ceramic shaped body-pushing member in such a state that it can apply a force to the ceramic shaped body in a different direction from the moving direction of the chucking units when it contacts said ceramic shaped body.

8. A body-positioning system as claimed in claim 5, wherein said system is configured to simultaneously position a ceramic shaped body in both said a moving direction and said traverse direction of said chucking units even if said chucking unit moves in uniaxial direction by providing a plurality of said body-pushing members on one chucking body.

9. A ceramic shaped body-positioning system as claimed in claim 6, wherein said system is configured to simultaneously position said ceramic shaped body in both of a moving direction of said chucking units and a transversal direction even if said chucking unit moves in uniaxial direction by providing a plurality of said ceramic shaped body-pushing members on one chucking body.

10. A ceramic shaped body-positioning system as claimed in claim 7, wherein said system is configured to simultaneously position said ceramic shaped body in both of a moving direction of said chucking units and a transversal direction even if said chucking unit moves in uniaxial direction by providing a plurality of said ceramic shaped body-pushing members on one chucking body.

11. The ceramic shaped body-positioning system as claimed in claim 1, wherein one of said at least one body pushing members has at least one dimension different from another of said body-pushing members.

12. The ceramic shaped body-positioning system as claimed in claim 1, wherein said plurality of holes are linearly aligned relative to said at least one path of movement.

13. The ceramic shaped body-positioning system as claimed in claim 1, wherein said plurality of holes comprise first holes linearly aligned relative to said at least one path of movement and at least one second hole located closer to the path of movement than said first holes.

* * * * *